United States Patent [19]

Enjo et al.

[11] Patent Number: 4,591,017
[45] Date of Patent: May 27, 1986

[54] BICYCLE WITH AN AUXILIARY ENGINE

[75] Inventors: Sadamichi Enjo; Yasuhiko Tsukiji; Goroei Wakatsuki, all of Saitama; Toushi Noguchi, Tokyo, all of Japan

[73] Assignee: Honda Giken Kogyo Kabushiki Kaisha, Tokyo, Japan

[21] Appl. No.: 690,239

[22] Filed: Jan. 10, 1985

[30] Foreign Application Priority Data

Jan. 11, 1984 [JP] Japan .................................. 59-3114

[51] Int. Cl.⁴ .............................................. B62K 11/04
[52] U.S. Cl. ..................................... 180/205; 180/74; 192/0.07
[58] Field of Search ................. 180/205, 206, 207, 74, 180/272, 271; 192/0.096, 0.084, 0.07, 0.02 R; 74/877, 879

[56] References Cited

U.S. PATENT DOCUMENTS

| 2,031,881 | 2/1936 | Evinrude | 180/205 |
| 4,364,448 | 12/1982 | Ikuma | 180/206 |
| 4,418,784 | 12/1983 | Fox | 180/74 |

FOREIGN PATENT DOCUMENTS 510000 1/1955 Italy .................................... 180/74
862626 3/1961 United Kingdom ............... 180/205

Primary Examiner—David M. Mitchell
Assistant Examiner—Everett G. Diederiks, Jr.
Attorney, Agent, or Firm—Armstrong, Nikaido, Marmelstein & Kubovcik

[57] ABSTRACT

A bicycle has an auxiliary engine, a wheel, and a clutch mechanism disposed between the auxiliary engine and the wheel for enabling and disabling power transmission between the auxiliary engine and the wheel to select one of a pedal-propelled drive mode and an engine-propelled drive mode of the bicycle. The bicycle includes a clutch lever for connecting and disconnecting the clutch mechanism, a throttle lever for controlling a throttle valve of the engine, a switching mechanism for connecting the clutch mechanism in coaction with the throttle lever when the clutch mechanism is disconnected, and an engine starting circuit closable and openable in response to connection and disconnection of the clutch mechanism. The clutch mechanism can be connected in response to operation of the throttle lever, the engine can be started when the clutch mechanism is connected, and the engine can be rendered inoperative in response to operation of the clutch lever.

13 Claims, 13 Drawing Figures

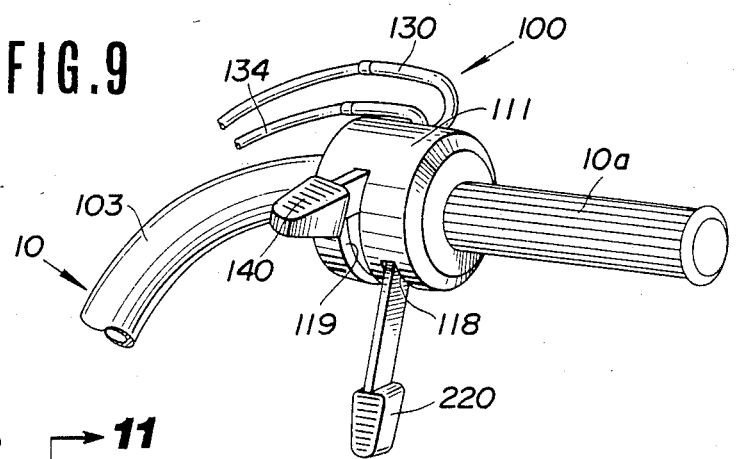
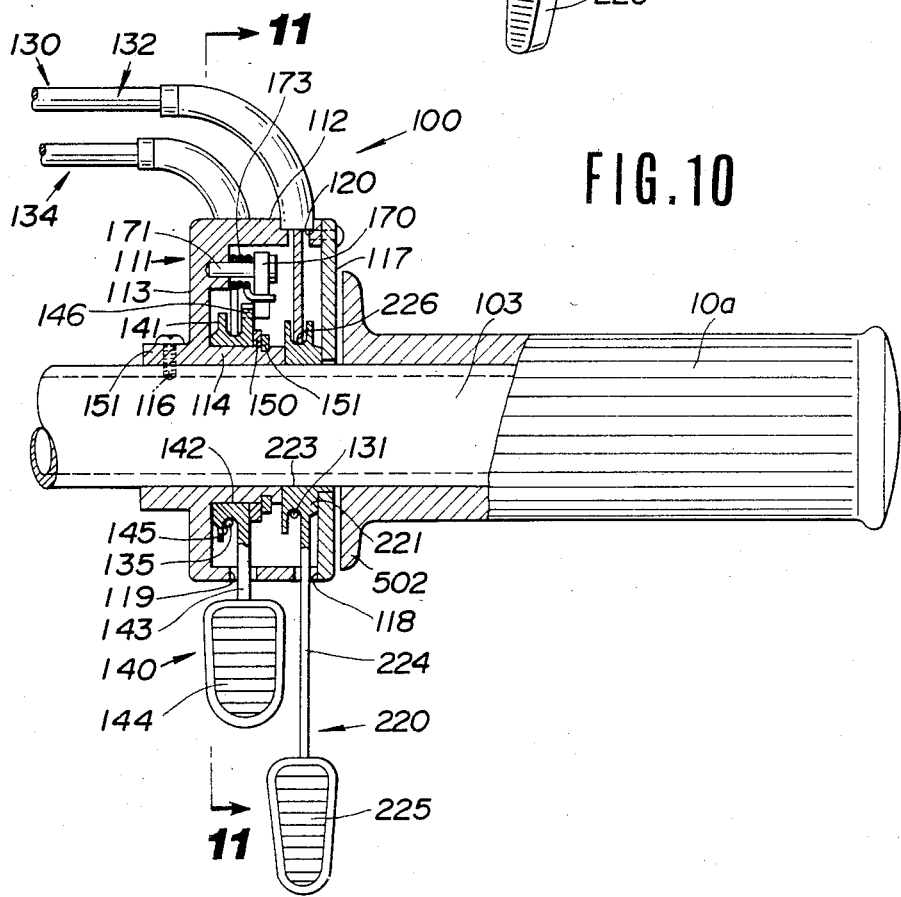

BICYCLE WITH AN AUXILIARY ENGINE

BACKGROUND OF THE INVENTION

The present invention relates to a bicycle having a human-powered pedal-propelled drive system and a separate drive system driven by an auxiliary engine.

There has heretofore been a bicycle having an auxiliary engine and a clutch mechanism disposed between the auxiliary engine and a rear wheel for enabling and disabling the transmission of engine power to the rear wheel. The actuation of the clutch mechanism therefore can select one of a human-powered pedal-propelled drive mode and an engine-powered drive mode for operation of the bicycle.

For example, there has been proposed a bicycle with an auxiliary engine as disclosed in Japanese Utility Model Publication No. 33-5413, for example. The disclosed bicycle includes a power unit comprising an engine and a roller rotatable by the engine, the power unit being swingably mounted on a bicycle body. The power unit can be swung by operating a switch lever attached to a steering bar handle for bringing the roller into and out of pressing contact with a rear wheel of the bicycle.

The switch lever on the conventional bicycle of the foregoing type is effective only in moving the roller into and out of engagement with the rear wheel. When the engine is to be started by transmitting pedal-propelled rotation of the rear wheel through the roller to the engine, the switch lever and a throttle adjustment are required to be independently operated substantially simultaneously. Therefore, the prior practice of how to get the engine started on the engine-assisted bicycle has been troublesome.

SUMMARY OF THE INVENTION

It is an object of the present invention to provide a bicycle with an auxiliary engine having an operating member for effecting switching between a pedal-propelled mode and an engine-propelled mode, the bicycle having a control structure with which the engine can be started through a simple operation.

According to the present invention, there is provided a bicycle comprising an engine, a wheel, clutch means for enabling and disabling the transmission of power between the engine and the wheel, a clutch control member for disconnecting the clutch means, a throttle control member for controlling a throttle valve of the engine, switching means for connecting the clutch means in coaction with the throttle control member when the clutch means is disconnected, and an engine starting circuit closable and openable in response to connection and disconnection of the clutch means, whereby the clutch means can be connected in response to operation of the throttle control member, the engine can be started while the clutch means is connected, and the engine can be rendered inoperative in response to operation of the clutch control member.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 9 is a perspective view of a modified control device;

FIG. 10 is an enlarged fragmentary cross-sectional view of the control device of FIG. 9;

DESCRIPTION OF THE PREFERRED EMBODIMENT

Figure 1:
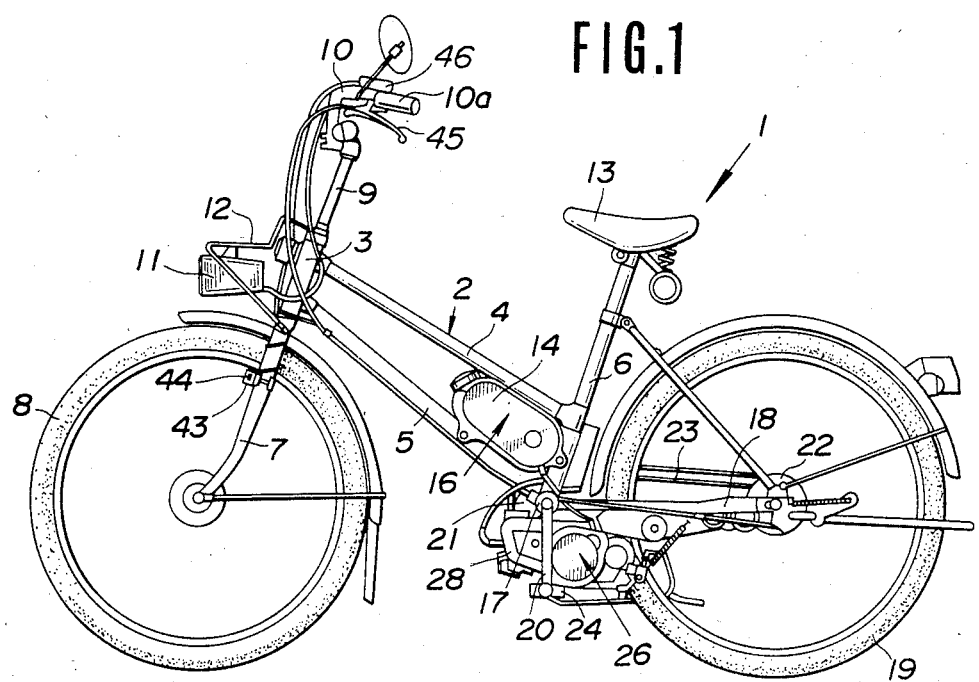
FIG. 1 is a side elevational view of bicycle with an auxiliary engine according to the present invention.
Figure 2:
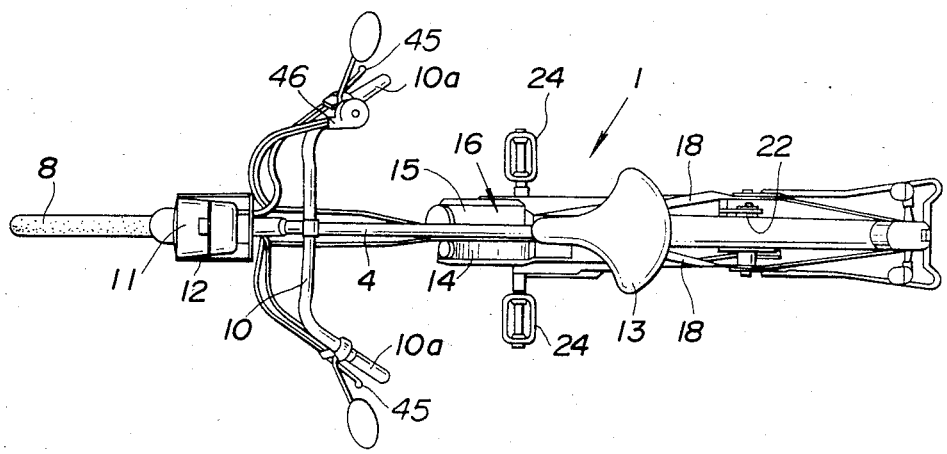
FIG. 2 is a plan view of the bicycle shown in FIG. 1.
Figure 3:
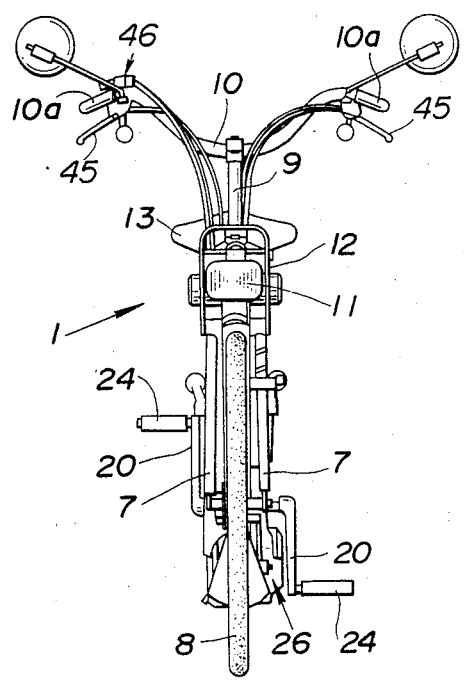
FIG. 3 is a front elevational view of the bicycle.
Figure 4:
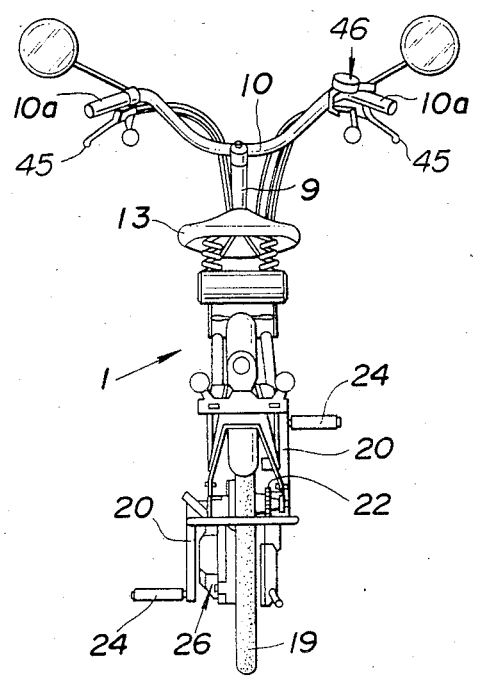
FIG. 4 is a rear elevational view of the bicycle.

As shown in FIGS. 1 through 4, a bicycle 1 with an auxiliary engine has a main frame 2 composed of a head tube 3, upper and lower tubes 4, 5 having front ends connected to the head tube 3 and extending rearwardly and downwardly, and a seat post 6 connected to rear ends of the upper and lower tubes 4, 5. A front wheel 8 is rotatably supported on a lower end of a front fork 7 supported on a lower end of the head tube 3. A steering bar handle 10 is mounted on an upper end of a steering stem 9 extending through the head tube 3. To the head tube 3, there is attached a stay 12 supporting a headlight 11 and shaped so as to double as a front carrier.

A saddle 13 is mounted on an upper end of the seat post 6. The upper tube 4, the lower tube 5, and the seat post 6 jointly define a space in which there is disposed a tank 16 composed of an oil tank 14 and a fuel tank 15 horizontally coupled together and fixed as by bolts to the upper and lower tubes 4, 5 and the seat post 6. The seat post 6 and the lower tube 5 are interconnected by a connecting member 17 to which is coupled a front end of a rear fork 18 having a rear end on which a rear wheel 19 is rotatably supported. A pedal crank 20 is inserted through the connecting member 17. An endless chain 23 is trained around a drive sprocket 21 fitted over the pedal crank 20 and a driven sprocket 22 fitted over an axle of the rear wheel 19. The bicycle can be propelled by alternately depressing pedals 24 attached to the pedal crank 20.

Figure 5:
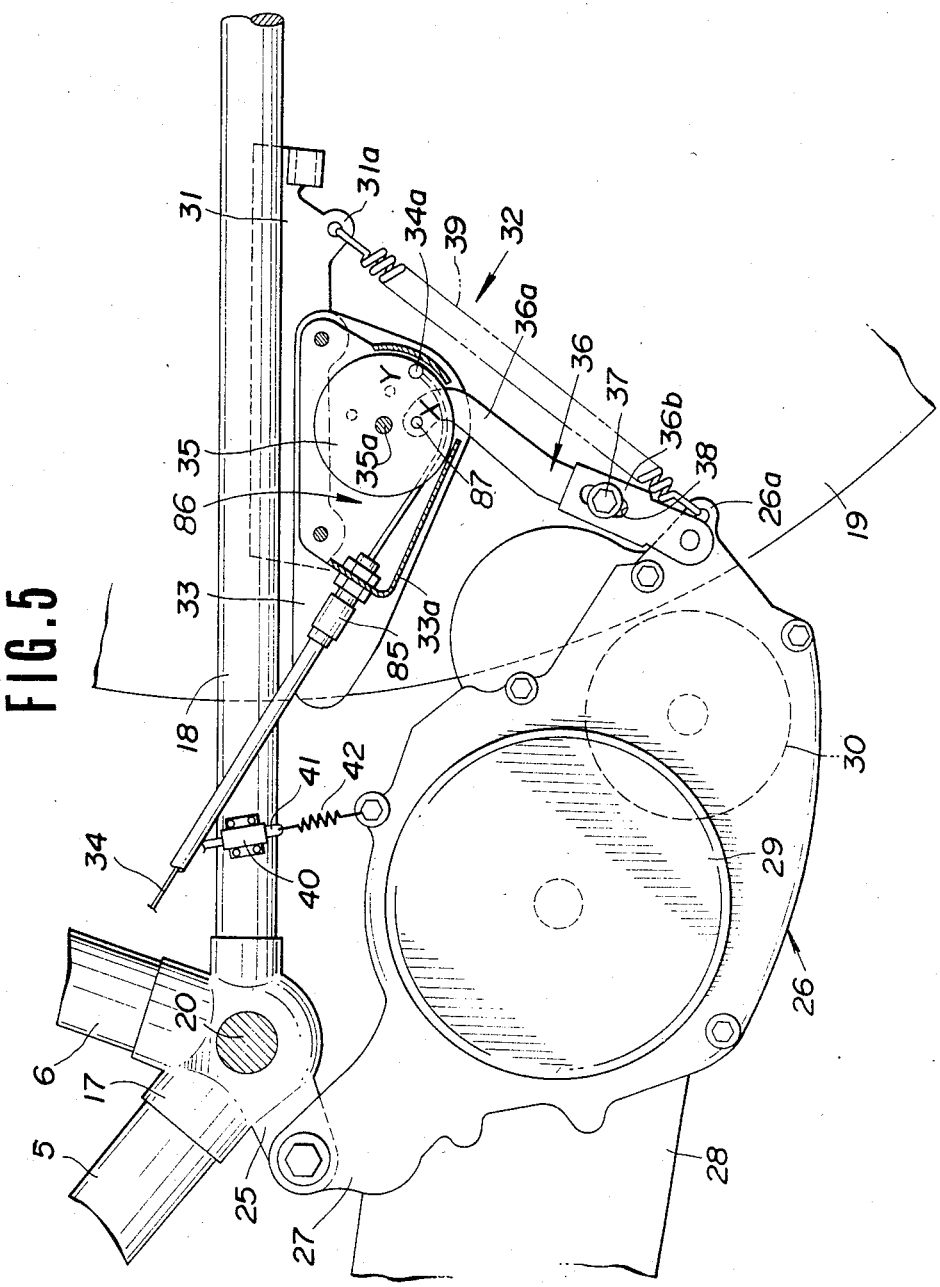
FIG. 5 is an enlarged fragmentary side elevational view, partly in cross section, of a power unit on the bicycle.

As illustrated in FIG. 5, the connecting member 17 includes a bracket 25 to which a hanger 27 of a power unit 26 is pivotably attached. The power unit 26 comprises a 2-cycle engine 28, a crankcase 29, an air cleaner, a carburetor, and a roller 30 coupled to a drive shaft of the engine 28. The power unit 26 is vertically swingable about a pivot at which the hanger 27 is pivotably mounted on the bracket 25.

From the rear fork 18 there depends a support member 31 supporting a control device 32 for controlling the roller 30. The roller 30 and the control device 32 function as a clutch for enabling and disabling the transmission of engine power between the engine 28 and the rear wheel 19. The control device 32 includes a spring 39 for pulling the power unit 26 upwardly toward the rear wheel 19, and a release device 86 for moving the power unit 26 angularly downwardly against the tension of the spring 39. The spring 39 comprises a high-tension spring having a high initial tensioning force and a low spring rate. The spring 39 has an upper end engaging a bracket 31a on a rear end portion of the support member 31 and a lower end engaging a bracket 26a on a rear end portion of the power unit 26. The release device 86 is pivotably supported in a casing 33a of a base bracket 33 fixed to the support member 31. The release device 86 is constructed of a pulley 35 to which is fastened an end of a roller control cable or clutch cable 34 extending to a control member, described later, and an arm 36 interconnecting the pulley 35 and the rear end portion of the power unit 26. The pulley 35 and the arm 36 constitute a toggle mechanism 46 for changing a releasing force acting on the roller 30 dependent on the stroke of the spring 39.

The arm 36 comprises a plate-shaped link bar 36a and a joint plate 36b having a bifurcated lower end. The link bar 36a has a curved upper end with its distal end pivotably coupled by a pin 87 to the pulley 35 in eccentric relation to a shaft 35a of the pulley 35. The link bar 36a has a lower end slidably attached to the joint plate 36b and fastened thereto by a bolt 37 extending through a slot 38 in the joint plate 36b. Since the link bar 36a and the joint plate 36b are coupled together by the bolt 37 extending through the slot 38, the combined length of the link bar 36a and the joint plate 36b can be adjusted to adjust the gap or spacing between the roller 30 and the rear wheel 19.

As shown in FIG. 5, an outer cable sheath 85 is attached to the base bracket 33, and a clutch cable 34 slidably extending through the outer cable sheath 85 has a portion projecting into the casing 33a of the bracket 33 and having an end 34a secured to an outer peripheral portion of the pulley 35. The clutch cable 34 has an opposite end secured to a roller control lever or clutch lever 47 on the bar handle 10.

The roller control lever or clutch lever 47 on the bar handle 10 is operated to pull the clutch cable 34 for turning the pulley 35 clockwise in FIG. 5 until the arm 36 is lowered to the position shown in FIG. 5 close to a lower stroke limit. The clutch lever 47 is locked in this position against the returning force of the spring 39 by a known locking mechanism. FIG. 5 shows such a locked condition in which the power unit 26 is angularly displaced downwardly by the arm 36 to keep the roller 30 out of contact with the rear wheel 19. In this position, the bicycle can be pedal-propelled by a rider.

The bicycle is then pedal-propeled until the speed of travel reaches a prescribed speed, whereupon the clutch lever 47 is unlocked. The power unit 26 is now pulled upwardly under the tension of the spring 39 to allow the roller 30 into pressing contact with the rear whel 19. At the same time, the arm 36 is moved upwardly to cause the pulley 35 to turn counterclockwise, thus moving the pin 87 from a position X to a position Y (FIG. 5). The roller 30 and the rear wheel 19 are now in pressing contact with each other, so that the rotation of the rear wheel 19 is transmitted through the roller 30 to the drive shaft of the engine 28 to start the engine 28.

For attaching the spring 39, its upper portion is displaced rearwardly so that the spring 39 is inclined from the arm 36 so as to be directed toward the center of rear wheel 19. This arrangement increases the force with which the roller 30 is pressed against the rear wheel 19 and also increases the ability of the roller 30 to follow the rear wheel 19.

For switching from the engine-propelled mode to the pedal-propelled mode, the clutch lever 47 is operated to pull the cable 34 to turn the pulley 35 clockwise in FIG. 5 against the tension of the spring 39 until the arm 36 is lowered from the position Y to the position X. The power unit 26 is angularly moved downwardly by the arm 36 to bring the roller 30 out of pressing engagement with the rear wheel 19. The bicycle can now be pedal-propelled.

As illustrated in FIG. 1, a lock 43 for locking the front wheel 8 is mounted on the front fork 7, and a key switch 44 actuatable by a key is disposed in the lock 43. The key switch 44 is electrically connected to the electric circuit for the engine 28. When the lock 43 is unlocked by the key, the switch 44 is turned on to close the electric circuit for the engine 23 to allow the engine 28 to be started. A switch 40 which opens and closes in response to vertical swinging movement of the power unit 26 is attached to the rear fork 18 and has an actuating member 41 coupled through a spring 42 to the power unit 26. The switch 40 is also electrically connected to the electric circuit for the engine 28. When the power unit 26 is swung downwardly to release the roller 30 off the rear wheel 19 in order to switch from the engine-propelled mode to the pedal-propelled mode, the switch 40 is turned off to open the electric circuit for the engine 28 to stop the engine 28 automatically.

The bar handle 10 has a pair of righthand and lefthand grips 10a, 10a and supports a pair of brake levers 45, 45 disposed adjacent to the grips 10a, 10a respectively. A control device 46 is also supported on the bar handle 10 in the vicinity of the righthand grip 10a.

Figure 6:
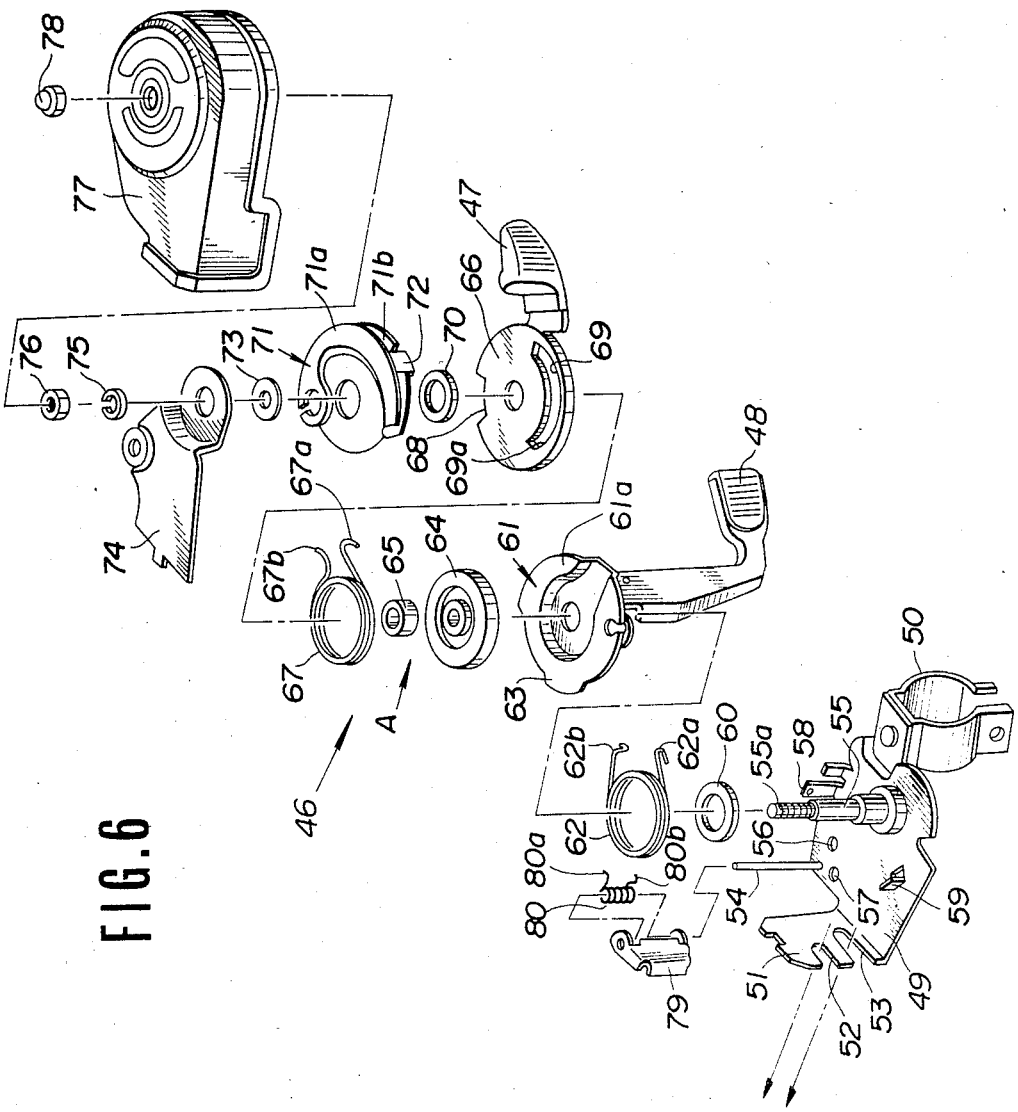
FIG. 6 is an exploded perspective view of a roller control unit.
Figure 7:
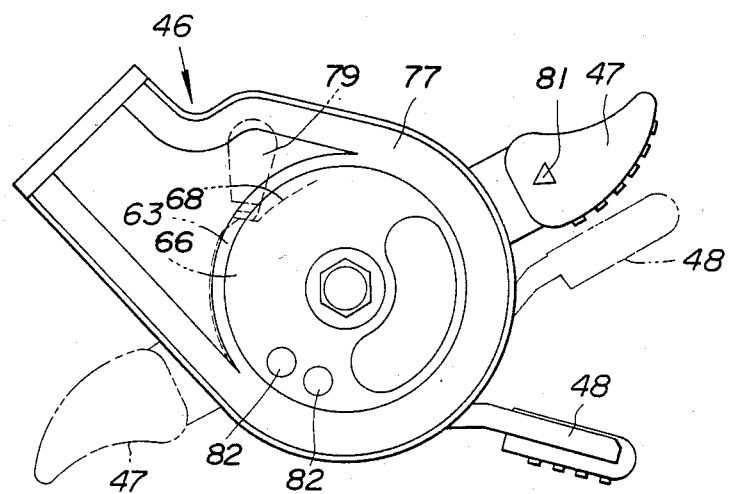
FIG. 7 is cross-sectional view taken along line 7—7 of FIG. 5.
Figure 8:
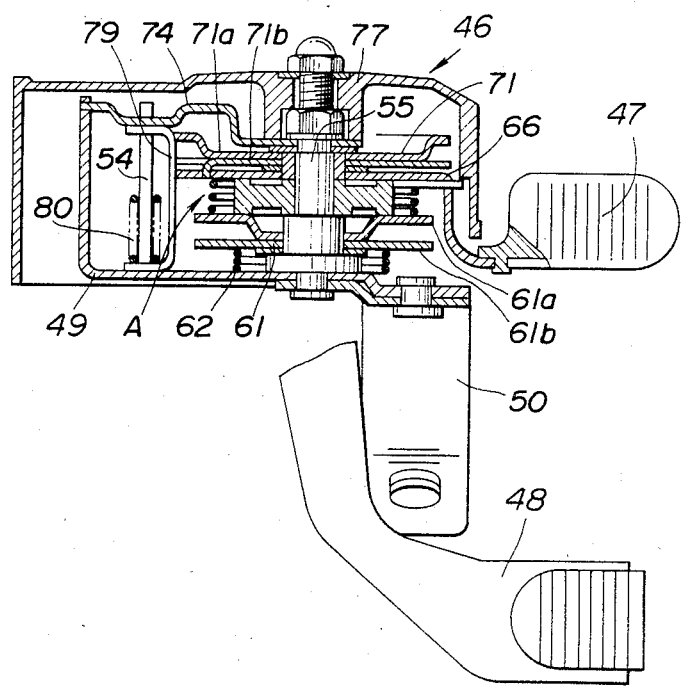
FIG. 8 is a diagram illustrative of a toggle mechanism.

The control device 46 is composed of various separate components, described later, as shown in FIG. 6. As illustrated in FIGS. 7 and 8, the control device 46 includes the clutch lever 47 serving as a control member for pulling the clutch cable 34 to take the roller 30 into an out of pressing contact with the rear wheel 19, a throttle lever 48 serving as another control member for controlling the output power of the engine 28, and an interconnecting mechanism A by which the clutch lever 47 and the throttle lever 48 are operatively connected to each other.

The components of the control device 46 will be described in greater detail in the order of assemblage with reference to FIG. 6. The control device 46 has a base plate 49 to which there is fixed a metal band 50 for attachment to the bar handle 10. The base plate 49 has an upright member 51 remote from the metal band 50 and having recesses 52, 53 for guiding the clutch cable 34 and a throttle cable. The base plate 49 supports thereon an upstanding pin 54 and an upstanding shaft 55 and has a hole 56 and an oblong hole 57 both for engagement with a spring, an upstanding finger 58, and a stopper 59 formed by slitting the base plate 49.

A throttle cable pulley 61 with the throttle lever 48 formed integrally therewith is fitted over the shaft 55 with a spacer 60 between the throttle cable pulley 61 and a lower end portion of the shaft 55. A return spring 62 has an end 62a engaging the pulley 61 and an opposite end 62b engaging in the oblong hole 57. As also shown in FIG. 8, the pulley 61 is composed of two plate member 61a, 61b defining a cable guide groove in an outer circumference. The plate member 61a has a projection 63 extending radially outwardly as shown in FIG. 6.

A plate 66 with the clutch lever 47 integrally formed therewith is fitted over the shaft 55 and disposed above the pulley 61 with collars 64, 65 interposed. A return spring 67 has an end 67a engaging the clutch lever 47 and an opposite end 67b engaging in a hole defined in the upstanding finger 58. The plate 66 has a recess 68 defined in an outer circumferential edge thereof and an arcuate slot 69 defined along an outer circumferential edge thereof substantially diametrically opposite to the recess 68. A clutch cable pulley 71 is fitted over the shaft 55 in overlying relation to the plate 66 with a spacer 70 interposed therebetween. As illustrated in FIG. 8, the clutch cable pulley 71 comprises two plate members 71a, 71b jointly defining a clutch cable guide groove in an outer cirumference. The plate member 71b has a downwardly projecting bent member 72 engaging in the arcuate slot 69 in the plate 66.

A plate 74 is fitted over the shaft 55 above the clutch cable pulley 71 with a spacer 73 interposed therebetween. The shaft 55 has an externally threaded portion 55a projecting upwardly from the plate 74. A nut 76 is threaded over the externally threaded portion 55a with a spring washer 75 disposed between the nut 76 and the plate 74. A cover 77 is also fitted over the shaft 55 above the nut 76 and fastened to the shaft 55 by a cap nut 78 threaded over the externally threaded portion 55a in covering relation to the components of the control device 46.

A pawl 79 is fitted over the pin 54, and a return spring 80 has an end 80a engaging the pawl 79 and an opposite end 80b engaging in the hole 56.

The control device 46 thus constructed will operate as follows: When the clutch lever 47 and the throttle lever 48 are positioned as indicated by the solid lines in FIG. 7, the bent member 72 of the clutch cable pulley 71 is held against one end 69a of the arcuate slot 69 in the plate 66 integral with the clutch lever 47. The clutch cable pulley 71 is now in an angularly displaced position in which the control cable is pulled. The arm 36 engaging the pulley 35 shown in FIG. 5 is positioned near the lower stroke end thereof, and the roller 30 is released out of engagement with the rear wheel 19. The bicycle is now in the pedal-propelled mode. The throttle lever 48 is in a position in which the throttle valve of the engine 28 is closed. Under this condition, the pawl 79 engages in the recess 68 in the plate 66 to prevent the plate 66 and the clutch cable pulley 71 engaging the plate 66 from being turned under the tensioning force of the spring 39. Therefore, the bicycle in maintained in the pedal-propelled mode without the clutch lever 47 being held by a finger.

The bicycle can be switched from the pedal-propelled mode into the engine-propelled mode simply by pushing forward the throttle lever 48 with the finger. When the throttle lever 48 is pushed in a direction to open the throttle valve against the force of the return spring 62 in order to start the engine 28, the throttle cable pulley 61 integral with the throttle lever 48 is turned counterclockwise in FIG. 7 to bring the projection 63 on the throttle cable pulley 61 into engagement with a side of the pawl 79. The pawl 79 is now turned clockwise in FIG. 7 about the pin 54 and released out of the recess 68 in the plate 66.

The tensioning force of the spring 39 is selected to be much greater than the tensioning force of the return spring 67, so that the power unit 26 is lifted by the spring 39 to bring the roller 30 into pressing contact with the rear wheel 19, whereupon the switch 40 is turned on. The rotation of the rear wheel 19 is then transmitted through the roller 30 to the drive shaft of the engine 28 to get the engine 28 started. Simultaneously, the arm 36 is moved upwardly to turn the pulley 35 counterclockwise in FIG. 5 for thereby winding the clutch cable 34. The clutch cable pulley 71 in the control device 46 is then turned against the force of the return spring 67. Since the bent member 69 of the clutch cable pulley 71 engages in the arcuate slot 69 in the plate 66, the plate 66 and the heavy clutch lever 47 integral therewith are also turned with the clutch cable pulley 71. When the clutch cable pulley 71 is stopped, the plate 66 and the clutch lever 47 are caused to turn idly for an angular interval corresponding to the length of the arcuate slot 69 against the force of the spring 67. Therefore, when the clutch cable pulley 71 is stopped, it is not subjected to the inertial force of the heavy clutch lever 47, and the clutch cable 34 is prevented from being slackened.

While in the engine-propelled mode, the clutch cable pulley 71 and the plate 66 are directly coupled with each other under the action of the return spring 67, and therefore the depth at which the roller 30 that is positionally changed dependent on the pneumatic pressure in the rear wheel 19 is pressed into the rear wheel 19 can be detected by the position of the clutch lever 47. The clutch lever 47 has a triangular marking 81 on an upper surface thereof, and the cover 77 also has markings 82 on an upper surface thereof. The pneumatic pressure in the rear wheel 19 can thus be checked by observing the positional relationship of the markings 81, 82.

With the foregoing embodiment of the present invention, the engine 28 can be started and controlled and the roller 30 can simultaneously transmit engine power to the rear wheel 19 with the operation of the output control member or the throttle lever 48. Therefore, switching to the engine-propelled mode and controlling the output power of the engine 28 can simultaneously be effected. When entering the engine-propelled mode, the speed of movement of the bicycle is reduced due to a braking force resulting from the pressing engagement of the roller 30 with the rear wheel 19, which is required to produce an energy for starting the engine 28. According to the present invention, the time required for restoring the bicycle speed to the desired level is shortened and engine throttle control can instantaneously be performed. Consequently, control steps involved in switching the bicycle to the engine-propelled mode from the pedal-propelled mode are simplified.

FIGS. 9 through 12 show a modified control device according to the present invention. Although the clutch lever 47 for controlling the roller 30 and the throttle lever 48 in the control device 46 shown in FIGS. 1 through 4 are angularly movable in substantially horizontal planes, the control device of FIGS. 9 through 12 has a clutch lever and a throttle lever which are angularly movable in substantially vertical planes.

The control device, generally designated at 100 has a drum-shaped housing 111 mounted on a handle pipe 103 adjacent to an inner end of a grip 10a fixed to an end of a bar handle 10. The housing 111 has an outer circumferential wall 112, an axial inner wall 113, and an inner circumferential wall 114. The inner circumferential wall 114 has an axial tubular flange 115 fastened by a screw 116 to the pipe 103. The housing 111 has an open end closed by a disk 117.

A throttle control lever 220 has a pulley 221 including an inner peripheral edge 223 rotatably fitted over the pipe 103 in a position axially between the disk 117 and an end of the inner circumferential wall 114. The lever 220 is angularly movable about the pipe 103 in a direction normal to the axis of the pipe 103. The lever 220 has an arm 223 extending radially outwardly from the pulley 221 through a slot 118 defined in the outer circumferential wall 112 of the housing 111. The arm 223 has a finger knob 225 on a distal end thereof. A throttle cable 130 has an inner cable member 131 wound and secured in a groove 226 defined in an outer periphery of the pulley 221 and an outer cable sheath 132 having an end engaging in one end of an engagement hole 120 defined in the outer circumferential wall 112 of the housing 111. The throttle cable 130 is connected to the arm of a carburetor throttle shaft (not shown) of the engine.

A control or clutch lever 140 for the roller 30 is disposed axially inwardly of and coaxially with the pulley 221 of the throttle control lever 220. The clutch lever 140 has a pulley 141 including an inner peripheral edge rotatably fitted over the inner circumferential wall 114 of the housing 111, and also an arm 143 extending radially outwardly from the pulley 141 through a slot 119 defined in the outer circumferential wall 112. The arm 143 has a finger knob 144 on a distal end thereof. A roller cable 134 has an inner cable member 135 with its end portion wound and secured by a ferrule 136 (FIG. 11) in a groove 145 defined in the outer periphery of the pulley 141. The pulley 141 has one axial end held against a radially inward surface portion of the axial end wall 113 and an opposite axial end held in position by a washer 150 and a clip 151 disposed around the inner circumferential wall 114.

Figure 11:
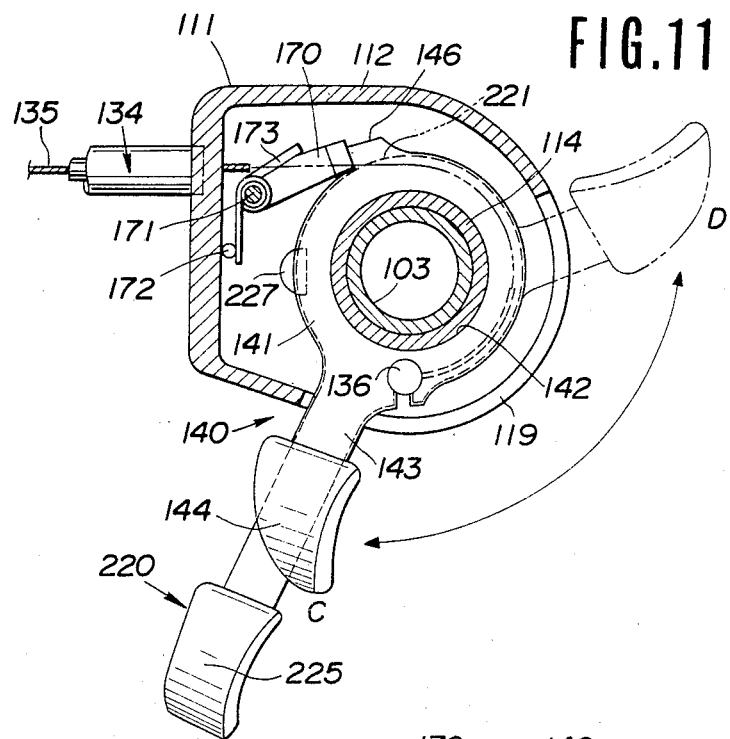
FIG. 11 is a cross-sectional view taken substantially along line 11—11 of FIG. 10.
Figure 12:
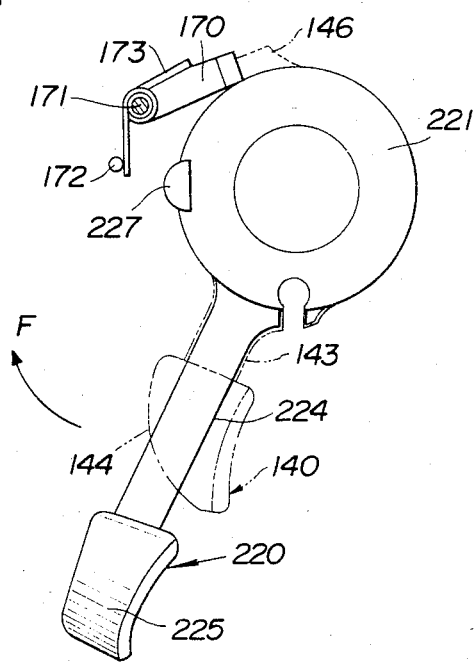
FIG. 12 is a view illustrative of the mamnner in which a throttle lever and a clutch lever are operatively coupled.

As illustrated in FIGS. 11 and 12, the pulley 141 has a stopper projection 146 on an outer peripheral surface thereof. A stopper pawl 170 is pivotably supported on a pin 171 having an end embedded in the axial end wall 113 and extending axially parallel to the pipe 103. The stopper pawl 170 is normally urged in a direction to resiliently contact the circumferential surface of the pulley 141 under the force of a torsion spring 173 having an end engaging an engagement pin 172 on an inner wall surface of the housing 111 and an opposite end engaging a side edge of the pawl 170. The lever 140 is thus prevented from being angularly moved counterclockwise in FIG. 11 by engagement between the pawl 170 and the stopper projection 146, and hence the inner cable member 135 connected to the pulley 141 is also prevented from being moved to the left in FIG. 14. Therefore, the pulley 35 of the release device 45 is kept positioned as shown in FIG. 5, and the roller 30 remains out of contact with the rear wheel 19.

The pulley 221 of the throttle lever 220 has a release projection 227 on an outer circumferential surface thereof. When the throttle lever 220 is angularly depressed in the direction of the arrow F (FIG. 12) in order to start the engine, the pulley 221 is also angularly moved to cause the release projection 227 to hit a lower side of the pawl 170 and move the pawl 170 against the force of the spring 173. The pawl 170 is thus released out of engagement with the stopper projection 146 on the pulley 141 of the clutch lever 140. Since the inner cable member 135 is biased by the spring 39, the clutch lever 140 is angularly moved counterclockwise (FIG. 11) from the position C to the position D, whereupon the arm 36 of the release device 45 is lifted to bring the roller 30 into pressing contact with the rear wheel 19.

Therefore, when the throttle lever 220 is actuated to open the throttle valve for starting the engine, the roller 30 is automatically released to move into contact with the rear wheel 19 to switch to the engine-propelled mode without having to operating the clutch lever 140.

In the control devices 46, 100 illustrated in FIGS. 6 through 8 and FIGS. 9 through 12, respectively, the clutch levers 47 140 and the throttle levers 48, 220 are disposed in parallel relation and can be angularly moved in one direction. Since the mechanisms associated respectively with the roller control clutch lever and the throttle lever are positioned closely to each other, they can be accommodated in one housing.

Figure 13:
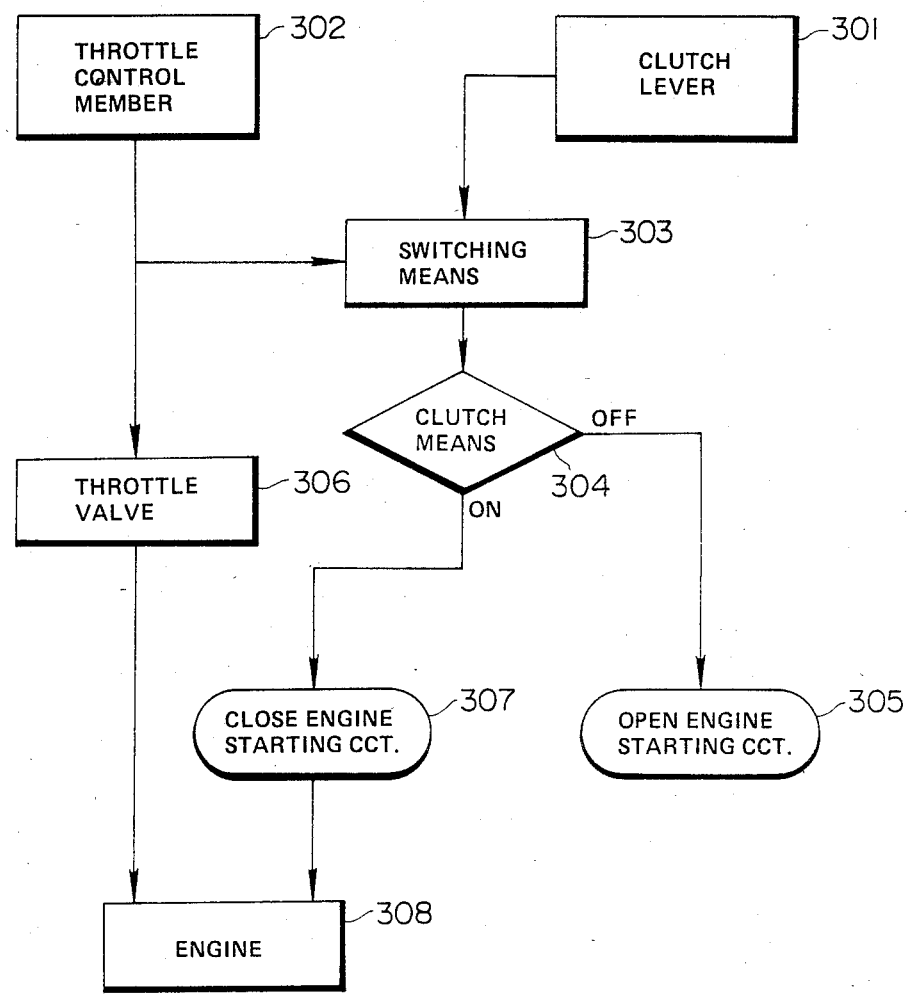
FIG. 13 is a flow diagram showing a process for operating the engine.

A process of operating the auxiliary engine of the bicycle according to the present invention will be described with reference to the flow diagram of FIG. 13. When a clutch lever 301 is actuated, a clutch means 304 for enabling and disabling the transmission of engine power from the engine to the rear or drive wheel of the bicycle is turned off or disengaged. At this time, a switching means 303 disposed between the clutch lever 301 and the clutch means 304 acts to hold the clutch means 304 disconnected. Therefore, the bicycle is kept in the pedal-propelled drive mode. While the clutch means 304 is being disconnected, an engine starting circuit is in an open condition 305 and hence the engine, denoted at 308 in FIG. 13, is not operated. Then, when a throttle lever 302 is actuated, at the same time that a throttle valve 306 is opened, the switching means 303 is actuated to engage the clutch means 304. Now, the power transmission between the engine and the drive wheel of the bicycle is able to be made, and the engine starting circuit is brought into a closed condition 307 to start the engine 308. Accordingly, the bicycle can smoothly be started while preventing an abrupt dashing movement of the bicycle which would be the case if the engine and the drive wheel were coupled after the engine has started.

The clutch means 304 may comprise any mechanism for enabling and disabling power transmission between the engine and the wheel, instead of the illustrated control device 32 for bringing the engine-driven roller 30 into and out of contact with the rear wheel 19, provided such mechanism can operate in the manner to perform the engine operating process shown in FIG. 13. The switching means 303 may comprise other mechanical or electric means than the illustrated ratchet mechanism 79, 66, 63; 170, 146, 227.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

What is claimed is:
1. A bicycle comprising:
(a) an engine;
(b) a wheel;

(c) clutch means for enabling and disabling the transmission of power between said engine and said wheel;

(d) a clutch control member operatively connected to said clutch means and having a first position for disconnecting said clutch means to disable power transmission and a second position for connecting said clutch means to enable power transmission;

(e) a throttle control member for controlling a throttle valve of said engine;

(f) switching means interconnecting said clutch control member with said throttle control member for releasing said clutch control member for movement from said first position to said second position when said throttle control member is operated; and (g) an electrical engine starting circuit including means closable and openable in response to connection and disconnection of said clutch means for making said engine operative when said clutch means is connected and inoperative when said clutch means is disconnected, whereby said clutch means can be connected in response to operation of said throttle control member, said engine can be started while said clutch means is connected, and said engine can be rendered inoperative in response to operation of said clutch control member from said second position to said first position.

2. A bicycle according to claim 1, wherein said switching means includes a locking mechanism for locking said clutch control member against movement from first position to said second position when said clutch control member is operated from said second position to said first position, and an unlocking member attached to said throttle control member for unlocking said locking mechanism in response to operation of said throttle control member.

3. A bicycle according to claim 1, including a steering bar handle having a grip, said clutch and throttle control members including respective first and second levers disposed adjacent to said grip and angularly movable in coaxial relationship to each other.

4. A bicycle according to claim 3, wherein said first and second levers are disposed in vertically spaced relation and angularly movable in a substantially horizontal plane.

5. A bicycle according to claim 3, wherein said first and second levers are angularly movable in a plane substantially perpendicular to a longitudinal axis of said steering bar handle.

6. A bicycle according to claim 1, wherein said openable and closable means includes a switch responsive to connection and disconnection of said clutch means for closing and opening said engine starting circuit, said switch being responsive to operation of said clutch control member from said second position to first position for opening said engine starting circuit.

7. A bicycle according to claim 1, wherein said clutch means comprises a roller rotatable by said engine and a roller control device for controlling said roller to move into and out of pressing contact with said wheel.

8. A bicycle according to claim 7, including a bicycle body, a power unit including said engine, said roller being supported on said power unit, said power unit being swingably supported on said bicycle body by said roller control device.

9. A bicycle according to claim 8, wherein said roller control device comprises a spring for normally urging said power unit in a direction to move said roller toward said wheel, and a roller release device for releasing said roller out of pressing contact with said wheel.

10. A bicycle according to claim 9, wherein said spring is connected between said bicycle body and said power unit.

11. A bicycle according to claim 10, wherein said roller release device comprises a pulley rotatably supported on said bicycle body and an arm having a first end pivotably supported on said pulley and a second end pivotably supported on said power unit, further including a cable having one end coupled to said clutch control member and an opposite end fastened to an outer circumferential surface of said pulley in a position such that when said clutch control member is operated to rotate said pulley, said pivot is angularly moved to a position close to a lower stroke limit of said puley.

12. A bicycle according to claim 1, wherein said first end of said arm is curved and pivotably coupled to said pulley in eccentric relation thereto.

13. A bicycle according to claim 11, wherein said arm is composed of upper and lower members relatively movably coupled to each other for adjusting the length of said arm.

* * * * *